Oct. 29, 1935.    H. GUHL    2,019,007
COCK FOR GAS RANGES AND THE LIKE
Original Filed Dec. 2, 1933
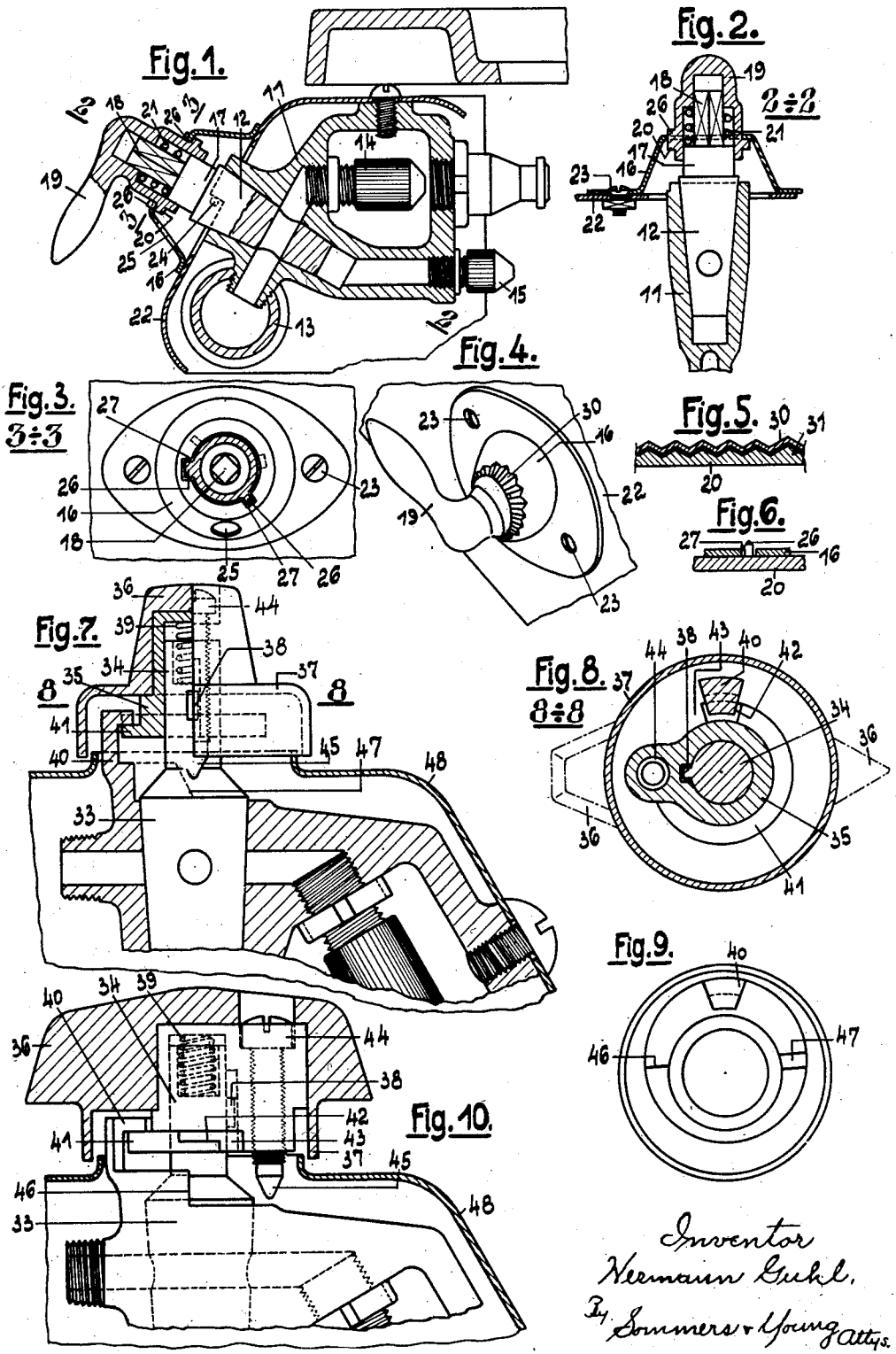
Inventor
Hermann Guhl,
By Sommers + Young attys.

Patented Oct. 29, 1935

2,019,007

UNITED STATES PATENT OFFICE 2,019,007

COCK FOR GAS RANGES AND THE LIKE

Hermann Guhl, Karlsruhe in Baden, Germany

Original application December 2, 1933, Serial No. 700,708. Divided and this application September 6, 1934, Serial No. 742,999. In Germany July 8, 1932

5 Claims. (Cl. 251—165)

This invention relates to a cock for gas ranges, gas cookers and the like, the present application being a division of my prior application, Serial No. 700,708, filed December 2, 1933.

The object of the invention is to simplify and improve the construction of a cock of the character described, particularly with reference to the means for holding the parts of the cock in assembled relation and for safeguarding against accidental or involuntary turning of the cock from its closed or other predetermined position.

In accordance with the preferred embodiment of the invention, a single spring is arranged to press the plug of the cock onto its seat and also to secure the handle of the cock in its adjusted position. Another feature of the invention involves the provision of a threaded member or screw arranged to hold the plug and handle of the cock in assembled relation thereon, and also operative to regulate the small flame of the burner. Other objects and advantages of the invention will appear from the following description of the preferred embodiments shown on the accompanying drawing.

Referring to the drawing:

Fig. 1 is a longitudinal sectional view of a gas cock embodying the invention;

Fig. 2 is a sectional view taken on the line 2—2 in Fig. 1;

Fig. 3 is a sectional view taken on the line 3—3 in Fig. 1;

Fig. 4 is a view in perspective of the cock employing a cap having radial grooves milled therein;

Figs. 5 and 6 are detailed views illustrating the engagement between the cock-handle and cap;

Fig. 7 is a view, partly in section, of a modification, the cock being shown in the "closed" position;

Fig. 8 is a sectional view taken on the line 8—8 in Fig. 7;

Fig. 9 is a plan view of the cock-body with the plug removed; and

Fig. 10 is a view similar to Fig. 7 showing the cock in the "open" position.

Referring to Figs. 1-6 of the drawing, a gas cock suitable for gas ranges and the like comprises a body portion 11 and rotatable plug 12, the body portion of the cock being shown as threaded into a gas supply pipe 13. The adjustable nozzles 14 and 15 of the cock direct the gas into the mixing tubes of the burner as more fully described in my prior application referred to above.

In the embodiment of the invention illustrated, a cap 16 serves for the fastening and securing of the cock-plug 12. The plug 12 is provided at its upper end with a cylindrical portion 17 and a shank 18 of square cross-section. The cock-handle 19 is mounted on the portions 17 and 18 of the plug, being held thereon by the cap 16. The portion of the cock-handle engaging said plug is provided with a collar 20 which is pressed against the underside of the cap 16 by a spring 21 disposed between the cylindrical portion 17 of the plug and the cock-handle. The cap 16 is fastened on the front-sheet 22 of the range in any suitable manner, as for example by the screws or bolts 23.

The plug 12 is provided with a stop-pin 24 adapted to engage a shoulder on the portion 11 of the cock to limit the movement of the plug. The position of said pin may be regulated from the outside, without removing any parts, through an opening 25 on the underside of the cap 16.

In accordance with a further feature of the invention, means is provided for holding the cock-handle in the "closed" position comprising projections 26 (see Figs. 1, 2, 3, and 6) on the collar 20 of the cock-handle adapted to engage the notches 27 of the cap 16. To open the cock, the cock-handle 19 is depressed towards the cock-plug until the projections 26 clear the notches 27 whereupon the handle may be turned. Upon closing the cock, the spring 21 urges the projections 26 into the notches 27 to lock the cock-handle in the "closed" position.

The spring 21 is thus arranged to press the plug 12 on its seat in the body-portion 11 and also to secure the cock-handle in the "closed" position in cooperation with the detent means 26, 27. The locking or detent means for the cock-handle may be modified without departing from the scope of the invention. For example, as shown in Figs. 4 and 5, it may comprise radial grooves milled in the cap 16 and adapted to engage similar grooves 31 in the collar 20 of the cock-handle, thereby locking the cock-handle in any adjusted position as well as in the "closed" position.

Figs. 7-10 show another form of construction of the fastening and detent means of the cock embodying the invention. The cock illustrated in these figures comprises the plug 33 having the usual bores or passages for the gas. On the cylindrical neck 34 of the plug 33 is disposed an interlocking sleeve member 35, said sleeve member being slidable on the neck portion of the plug 33. The handle 36 and cap 37 are connected with the sleeve member 35 and may be formed integral therewith. The cock-plug is keyed to the sleeve member 35 and cock-handle in any suitable manner, as for example by the key or projection 38. A compression spring 39 between the outer end of the cock-plug and the sleeve member 35 serves to press the plug on its seat and to secure the cock-handle in the "closed" position against involuntary or accidental opening of the gas-cock.

For the latter purpose, the body of the cock is provided with a projection or upstanding lug 40 adapted to engage a notch or recess in the collar 41 of the sleeve member 35. The collar 41 is provided with two recesses 42 and 43, as shown in Figs. 8 and 10, the recess 42 extending partway through said collar and the notch 43 extending entirely through the same. The recess 42 cooperates with the lug 40 to lock the cock-handle in the "closed" position while the recess 43 is provided to allow the cock-handle 36 and sleeve member 35 to be placed upon the neck 34 of the cock-plug.

A screw 44 having a conical tip 45 is threaded into the sleeve member 35. The length of the screw 44 is such that when the cock-handle 36 is mounted on the cock-plug, the inner end of the screw is adapted to engage the shoulders 46 and 47 (see Figs. 7, 9, and 10) formed on the body portion of the cock. In order to assemble the cock-handle 36 on the cock-plug, the screw 44 is turned out or withdrawn until the tip end will not engage the shoulders 46 and 47. The handle is then applied to the shank of the cock-plug with the notch 43 in alinement with the lug 40. After the handle is turned to the position shown in Fig. 7, the screw 44 may be turned in until the tip end lies in the plane of the shoulders 46 and 47. Then the cock-handle cannot be removed because of the engagement of the screw with said shoulders and because the lug 40 overlies the collar 41 on the sleeve member 35. The shoulder 47 has a sloping face, as shown in Fig. 7, adapted to engage the conical tip 45 of the screw 44 whereby turning of the screw 44 effects a precise adjustment of "low" position of the cock-plug which may be utilized to regulate the quantity of gas supplied to the small flame through the usual separate passage, not shown, in the cock-plug. The screw 44 has therefore two functions, serving both as an interlocking and as a regulating member.

By the described construction, the handle may be removed in a simple manner and the plug of the cock may be taken out for the purpose of cleaning by merely turning the screw 44. The cock-plug is held in the "closed" position by detent means including the spring 39, which also serves to press the plug on its seat. The cap 37 on the handle covers the cock and forms together with the protecting shield or name plate 48 a closure for the cock.

The embodiments of the invention described above for purposes of illustration may be modified without departing from the scope of the invention as defined by the appended claims.

I claim:

1. A gas burner for gas ranges and the like comprising a cock having a body portion, a rotatable plug seated therein, a neck portion on said plug, a handle for said plug mounted on said neck portion, said handle being keyed to said neck for rotation therewith and movable longitudinally thereof, interengaging means on said handle and body portion serving to prevent removal of said handle from said neck portion within the normal range of rotation of said handle in operating said plug, an adjustable screw mounted in and extending through said handle substantially parallel with and offset from the axis thereof, said screw having a conical point adapted to engage said body portion to limit rotary movement of said handle and plug to prevent uncoupling of said interengaging means and serving as an adjustable stop to regulate the gas flame.

2. A gas burner according to claim 1 in which said screw prevents removal of said handle until turned to a predetermined retracted position to permit turning of said handle to disengage said interengaging means.

3. A gas burner according to claim 1 in which the handle is provided with a recess and a stationary projection is provided extending into said recess in the "off" position to secure the cock against involuntary opening thereof, said handle being movable to release the engagement with said projection.

4. A gas burner according to claim 1 in which detent means engaging the handle is provided to prevent involuntary opening of the cock, said detent means including a spring also urging the plug of the cock towards its seat.

5. A gas cock for gas ranges and the like comprising a body portion, a plug seated therein, a detachable handle for said plug, a screw threaded into said handle with the tip end thereof extending adjacent the body portion of the cock, an upstanding lug on said body portion, shoulders on said body portion adapted to engage the tip end of said screw to limit the turning movement of said handle, and a collar secured to said handle and provided with a recess adapted to clear said lug when the handle is mounted on the plug, the angular relation of said shoulders and said screw being such as to prevent turning of said handle to a position to bring said lug and recess into registry so that the handle may only be removed by bringing the lug and recess into registry when said screw is turned to a position where the tip end thereof will not engage one of said shoulders.

HERMANN GUHL.